UNITED STATES PATENT OFFICE.

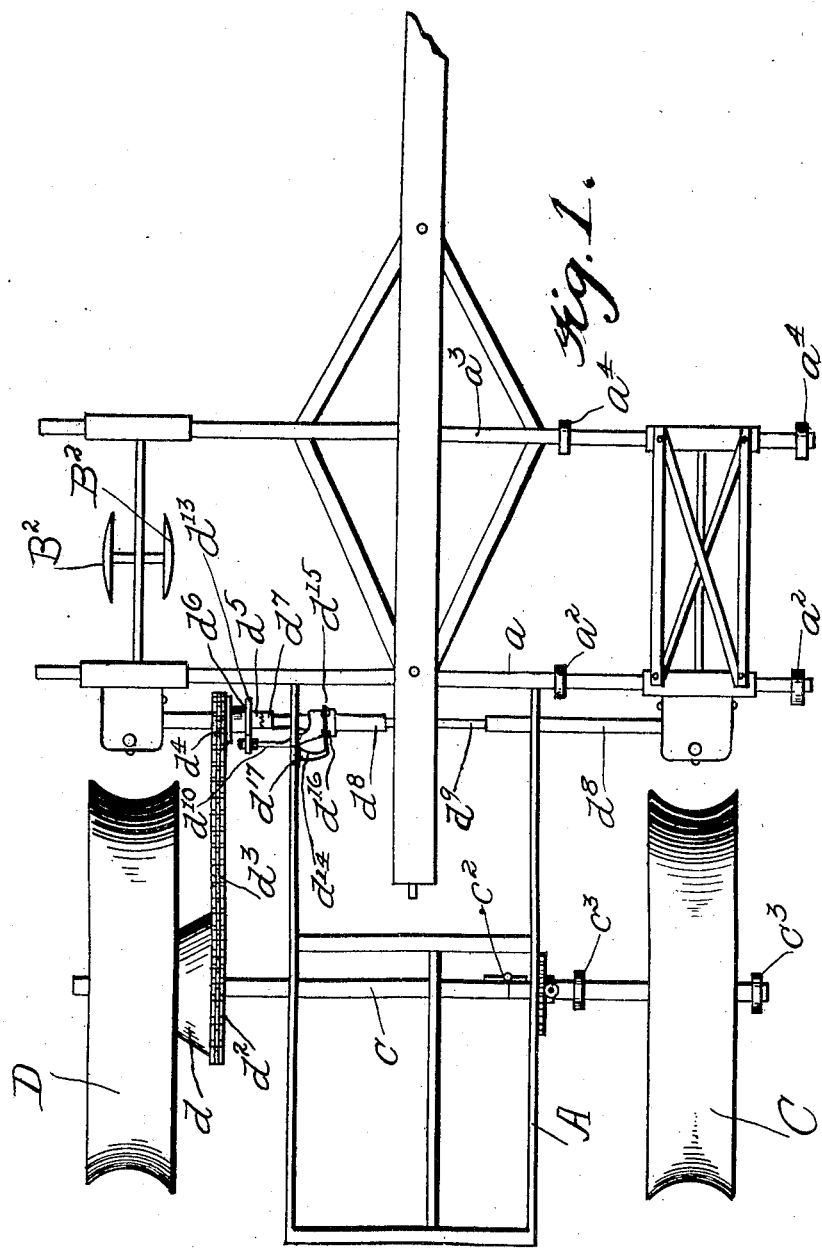

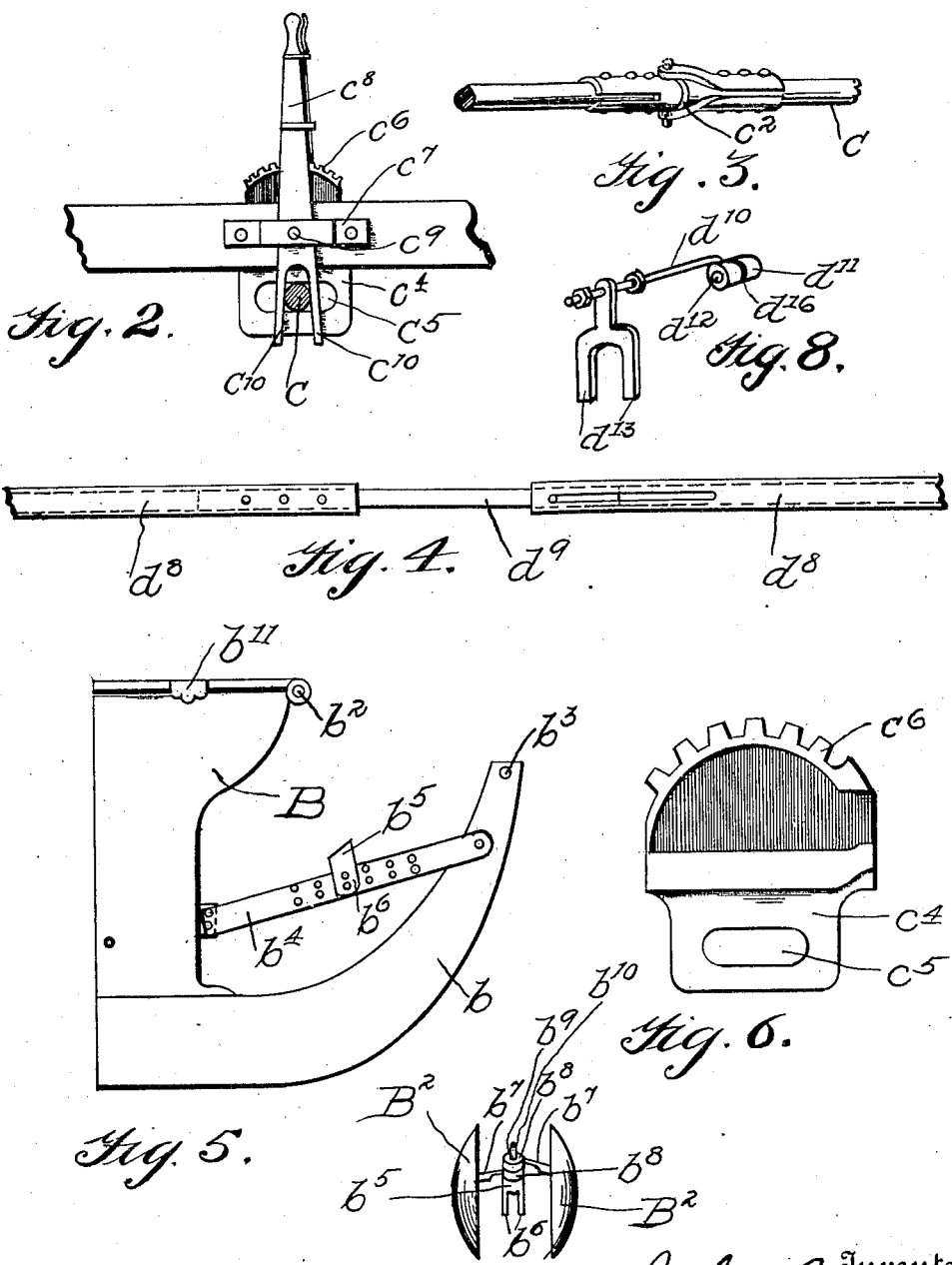

JOHN B. REED, OF GRIDLEY, KANSAS.

SEED-PLANTER.

No. 852,398.  Specification of Letters Patent.  Patented April 30, 1907.

Application filed November 30, 1906. Serial No. 345,817.

*To all whom it may concern:*

Be it known that I, JOHN B. REED, a citizen of the United States, residing at Gridley, in the county of Coffey and State of Kansas, have invented certain new and useful Improvements in Seed-Planters; and I do hereby declare the following to be a full, clear, and exact description of the invention, such as will enable others skilled in the art to which it appertains to make and use the same.

The object of my invention is, generally, the construction of an agricultural machine, in the nature of a corn or other planter, which shall be thoroughly efficient in operation, durable and not liable to get out of order in use, and simple of construction.

More specifically, the object is to provide means for effectually retaining the runners of the machine in the middle of the ditch, trench, drill, or furrow, at all times.

Another specific object is so to mount one runner and one wheel that the wheels and runners may adjust themselves to drills or ditches of different distances apart, thus maintaining the wheels and runners in the drills at all times, no matter how the space between the two drills may vary from time to time.

Another specific object is to provide means for controlling the movement of the loose or slidable wheel, when the machine is being turned around at the end of a field, or the like, where the wheels have no ditches or drills to move in.

With these and other objects in view, which will be divulged as the specification proceeds, my invention comprehends the novel construction, combination, and arrangement of parts of a machine characterized by my invention, as will be hereinafter fully described in the specification, summed up in the claims, and illustrated in the drawings, in which latter:

Figure 1 is a top plan view of a corn-drill embodying my improvements; Fig. 2 is a fragmentary detail view of the means for controlling the slidable wheel; Fig. 3 is a fragmentary detail view of the hinge-portion of the axle of the wheels; Fig. 4 is a fragmentary detail view of the rotatable two-membered shaft and of the connecting rod telescoping within one of the members; Fig. 5 is a detail view, in side elevation, of one of the runners or furrow openers; Fig. 6 is a detail view of the toothed casting, in an opening of which one end of the hinged axle works; Fig. 7 is a detail view of the disks and means for attaching same to the straps; Fig. 8 is a detail view of a certain portion of my invention.

Referring to the drawings, A represents the main frame, so called, of the machine, to which is connected in any suitable manner, a shaft $a$ passing through an eye or opening $b^2$ in a runner-casting B on each side of the machine, to which runner-casting is secured or made integral therewith a runner or furrow opener $b$ of the usual form, that is, with a base portion an upward curved neck perforated toward the top, as at $b^3$. One of the runner-castings is slidably mounted on the shaft $a$ and has play thereon limited by stops or abutments $a^2$, $a^2$, whereby it may adjust itself as the space between the two drills or ditches narrows or widens, thus to keep the runners in the center of the ditches or drills under all circumstances and conditions.

Connecting the necks of the runners or furrow openers is another shaft $a^3$ passing through the opening $b^3$ and provided with stops or abutments $a^4$, $a^4$, limiting movement of the slidable runner thereon. The remaining runner and runner-casting have no slidable movement.

Secured at one end to the neck of the runner and at the other end to the standard or casting B of each runner are straps $b^4$, on which are adapted to be secured a pin $b^5$ formed with perforated forks or legs $b^6$, through the perforations of which and through the straps may be passed securing means, whereby to retain the pin on the straps. Adapted to be secured to the head of the pin $b^5$ is a stub-shaft $b^7$ formed with an enlargement $b^8$ formed with an interior channel $b^9$, through which passes a pin $b^{10}$ carrying a concaved disk $B^2$. It is my object to position the disk so that the concavity, or concave side, thereof is toward the runner, for subserving the dual function of cutting off dirt from the sides of the ridges and causing the runners to stay in the center of the ditch, when the machine is in operation.

I am aware that it is old in the art to position disks so that the convex side thereof is toward (not away from) the runner, and this is done for the purpose of throwing dirt away from the runner; but my construction and the object in view are just the reverse, and I am enabled more satisfactorily and efficiently by my construction to maintain the runners at all times in the center of the drill.

Connecting the wheels C and D is an axle $c$ hinged, as at $c^2$, and provided with stops or abutments thereon $c^3$, $c^3$, the wheel C being slidably mounted and movement thereof limited by said stops.

Secured to the frame A is a casting $c^4$, provided with a slot $c^5$ toward its lower end, through which extends the axle $c$, and with a curved rack $c^6$ on its top edge. Secured to the frame A near the casting $c^4$ is a strap $c^7$, between which and the frame A works a lever $c^8$, having its fulcrum point on a securing pin $c^9$, and provided with forks or legs $c^{10}$ at its lower portion, straddling the axle $c$.

It will be noted that the wheels C and D will follow the ditches, the wheel C sliding back and forth on the axle $c$ as the space between the two drills may vary from time to time; but, when it is desired to turn the machine around, as at the end of a field, where the wheels have no drills to follow, the wheel C would either slide inward or outward to the limit of its range of movement, depending on whether the planter or machine were turned in the direction of, or away from, the slidable wheel C; and, for the purpose of controlling such wheel, I have made the axle $c$ hinged and provided the lever $c^8$ to incline the short end of the axle toward the front or rear of the planter or machine, as desired, when turning the machine around. It will be noted, also, that the slidable wheel C is on the same side of the machine as is the slidable runner, and that such slidable wheel and slidable runner has preferably the same degree or amount of play on the axles or shafts.

The spokes of the wheel D are provided with a toothed wheel $d^2$ meshing with an endless sprocket chain $d^3$ passing over another toothed wheel $d^4$ provided with a smaller toothed end $d^5$ and with a circumferential channel or groove $d^6$ in proximity to such toothed end. The toothed end $d^5$ engages with a toothed collar $d^7$ secured to a two-part rod $d^8$ engaging in groove $b^{11}$ of the runner-casting B with the usual hopper-plates, and the two parts or members of the rod being connected by a link $d^9$ telescoping into one section or member of the rod $d^8$ and capable of slidable movement therein, as clearly shown in Fig. 4. Supporting that member of the rod $d^8$ on which is secured the collar $d^7$ is a member $d^{10}$ provided at one end with an enlargement $d^{11}$ interiorly slotted, as at $d^{12}$, through which is passed one member of the rod $d^8$, and provided at its other end with a fork, or legs, $d^{13}$ straddling the wheel $d^4$ in the groove $d^6$ thereof. A hanger or member $d^{14}$ has legs, or a fork, $d^{15}$ (similar to $d^{13}$,—see Fig. 8) at one end embracing the member $d^{10}$, in a circumferential groove $d^{16}$ in the enlargement $d^{11}$, and at its other end is secured to the frame A, as at $d^{17}$.

It will be noted that as the wheel D revolves, the wheel $d^2$ is revolved, turning the chain $d^3$, which revolves the wheel $d^4$, which rotates the rod $d^8$, actuating the usual hopper-plates.

It will be understood that my drill or machine may also be used to plant where there are no ditches or drills by simply taking off the disks, and adjusting the stops (which limit movement of the loose runner and loose wheel), for rows of the desired distance apart.

Having thus fully described my invention, what I claim and desire to secure by Letters-Patent is:

1. In a corn-drill, or the like, a shaft, a runner mounted for limited reciprocatory movement thereon, and a dish-shaped or concaved disk supported on each side of the runner with the concavity thereof toward the runner.

2. In a corn-drill, or the like, an axle, a wheel mounted for limited reciprocatory movement thereon, a runner, and a dish-shaped or concaved disk supported on each side of the runner with the concavity thereof toward the runner.

3. In a corn-drill, or the like, a hinged axle, a wheel mounted for limited reciprocatory movement thereon, a runner, and a dish-shaped or concaved disk supported on each side of the runner with the concavity thereof toward the runner.

4. In a corn-drill, or the like, a hinged axle, means for moving the hinged portion of the axle, a wheel mounted for limited reciprocatory movement thereon, a runner, and a dish-shaped or concaved disk supported on each side of the runner with the concavity thereof toward the runner.

5. In a corn-drill, or the like, a hinged axle, a lever for moving the hinged portion of the axle, a wheel mounted for limited reciprocatory movement thereon, a runner, and a dish-shaped or concaved disk supported on each side of the runner with the concavity thereof toward the runner.

In testimony whereof, I affix my signature, in the presence of two subscribing witnesses.

JOHN B. REED.

Witnesses:
  G. S. ERRETT,
  ALICE REED.